No. 843,228. PATENTED FEB. 5, 1907.
M. MURRAY.
SPRING WHEEL.
APPLICATION FILED SEPT. 21, 1906.

Witnesses
O. N. Woodson
A. T. Measer

Inventor
M. Murray,
By R. S. & A. P. Lacey,
Attorneys

UNITED STATES PATENT OFFICE.

MICHAEL MURRAY, OF HARRISBURG, PENNSYLVANIA.

SPRING-WHEEL.

No. 843,228.      Specification of Letters Patent.      Patented Feb. 5, 1907.

Application filed September 21, 1906. Serial No. 335,664.

*To all whom it may concern:*

Be it known that I, MICHAEL MURRAY, a citizen of the United States, residing at Harrisburg, in the county of Dauphin and State of Pennsylvania, have invented certain new and useful Improvements in Spring-Wheels, of which the following is a specification.

This invention relates to that type of spring-wheel constructions in which the wheel comprises a rim to which are applied a plurality of springs designed to receive the shock and absorb vibration incident to the employment of the wheel under actual conditions of service.

The essential features of the invention include the provision of practical means for applying the springs to the wheel, for securing a suitable tire to the springs, and for protecting the springs and connecting parts.

For a full description of the invention and the merits thereof and also to acquire a knowledge of the details of construction of the means for effecting the result reference is to be had to the following description and accompanying drawings, in which—

Figure 1:
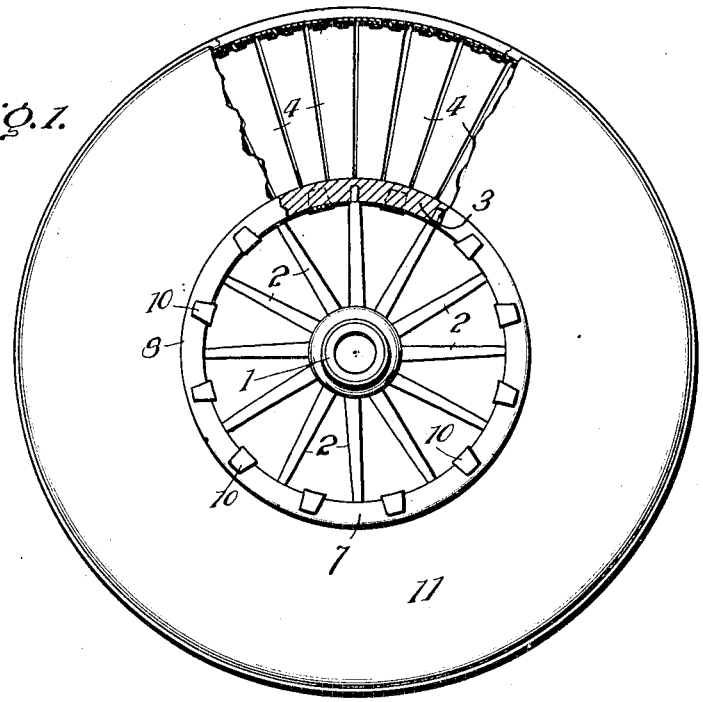
Figure 2:
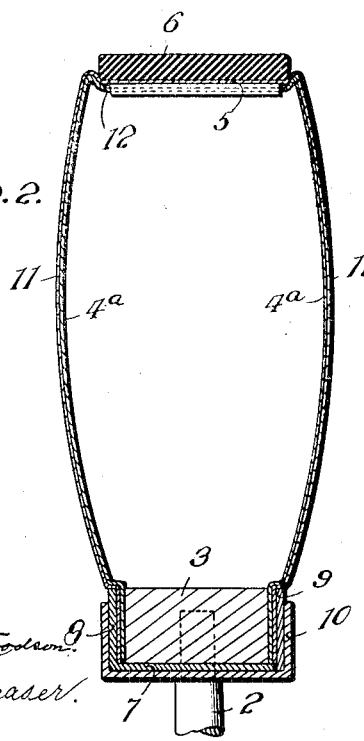
Figure 3:
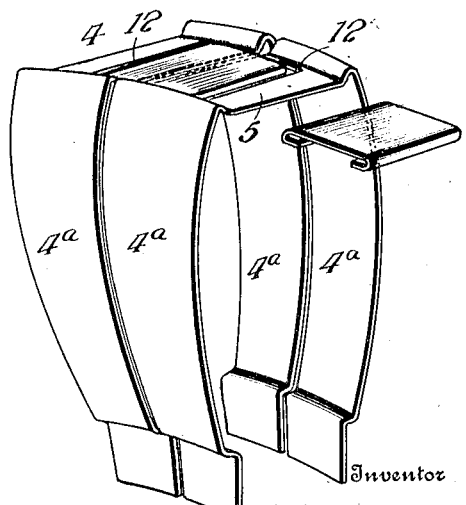

Figure 1 is a side elevation, partially broken away, showing a wheel embodying the essential features of the present invention. Fig. 2 is a sectional view bringing out more clearly the manner of attaching the springs to the wheel. Fig. 3 is a detail perspective view showing more clearly the connecting means between the several springs.

Corresponding and like parts are referred to in the following description and indicated in all the views of the drawings by the same reference characters.

Specifically describing the invention, the numeral 1 designates the hub of the wheel, to which are applied spokes 2. The spokes 2 are connected at the outer ends by means of a rim 3, and the springs which give the desired elasticity or resiliency to the wheel structure are indicated at 4 and are mounted on the rim 3. The springs 4 are of somewhat U form, comprising opposite sides $4^a$, which are bowed somewhat and which are adapted to yield outwardly. The outer portion of each spring 4 is provided with a depression which constitutes a seat 5, in which the tire 6 of the wheel is received. The formation of the seats 5 in the aforesaid springs 4 is such that the tire 6 cannot be accidentally displaced by lateral movement. The inner extremities of the sides $4^a$ of the springs 4 are disposed at opposite sides of the rim 3 of the wheel. Said extremities of the springs are peculiarly attached to the rim 3, and for this purpose a circular plate 7 is employed, being located in contact with the inner side of the rim 3 and being formed with openings through which the spokes 2 pass to points of connection with said rim. The plate 7 is formed at one of its edges with an outwardly-extending flange 8, which is adapted to engage the outer sides of those extremities of the springs 4, located at one side of the rim 3. In other words, the annular flange 8 of the plate 7 is located at one side of the rim 3 and attaches certain extremities of the springs 4 to the rim. At the opposite side of the rim the annular plate 9 is employed to perform the same functions with respect to opposite end portions of the springs 4 as is performed by the flange 8 above described. The plate or ring 9, together with the plate 7 and its flange 8, are secured to the rim 3 by means of small clamps 10, opposite end portions of which engage the flange 8 and the ring 9, which are firmly in contact with the inner extremities of the sides of the springs 4.

The foregoing briefly describes the structure of the wheel and tire, and it is apparent that the mounting of the springs 4 is such that the same will yield readily when the wheel passes over obstacles and will absorb vibration and jar in a very effective manner by reason of the resilience or elasticity of the said springs. It is contemplated to provide flexible sides of fabric material or rubber or the like, to inclose the springs 4, said sides being indicated at 11 and being fastened at the outer and inner edges to the outer adjacent tire 6 and the rim 3, respectively. The sides 11 will prevent the springs 4 from being clogged with foreign matter, such as dirt or the like, and will otherwise protect these springs from the elements, and thereby increase the life of the wheel. Each of the springs is preferably provided at its outer portion, which is formed with the seat 5, with an opening 12, and small metal plates are preferably attached to the springs by having the ends thereof engaging in the openings 12, so that all the springs surrounding the wheel are linked together, thus holding said springs in proper relative positions under all working conditions. This is an advantageous feature of the invention.

It is contemplated that the form of the springs 4 may be modified somewhat; but the preferred form thereof is illustrated and above described.

Having thus described the invention, what is claimed as new is—

In a spring-wheel, the combination of a rim and a tire therefor, a plurality of springs applied thereto and comprising spaced sides the inner extremities of which are arranged at opposite sides of the rim, a plate arranged at the inner side of the rim and having an outwardly-projecting flange engaging the extremities of the springs at one side of the latter, a detachable ring engaging the opposite extremities of the springs, and clamp means for holding the flange and the ring aforesaid positively in engagement with the springs.

In testimony whereof I affix my signature in presence of two witnesses.

MICHAEL MURRAY. [L. S.]

Witnesses:
   ELSIE R. WOLF,
   A. B. GINGRICH.